United States Patent Office 3,134,746
Patented May 26, 1964

3,134,746
BLENDS OF EPSILON CAPROLACTAM POLYMER AND GRAFT COPOLYMER ALKENYL CYANIDE AND ALKENYL SUBSTITUTED AROMATIC HYDROCARBON ON POLYBUTADIENE
Thomas S. Grabowski, Vienna, W. Va., assignor to Borg-Warner Corporation, Chicago, Ill., a corporation of Illinois
No Drawing. Filed June 9, 1961, Ser. No. 115,897
5 Claims. (Cl. 260—45.5)

The present invention relates to synthetic resins having new and unique properties and more particularly to a synthetic resin blend which is easily processed into structural shapes and which has overall physical properties desirable for many applications.

The polymer of epsilon caprolactam has many desirable properties for the fabrication of structural shapes, such as tensile strength, elongation, hardness, and stability in the presence of solvents. However, the polymer has a relatively low impact strength, especially at low temperatures, and a low heat deflection temperature. Graft copolymers of acrylonitrile, butadiene, and styrene also have many desirable physical properties making them useful for many structural shapes, such properties being high impact strength at both room and low temperatures, 73° F. and −40° F. respectively, and a relatively high heat deflection temperature. These graft copolymers are also difficult to process by the injection molding technique.

One of the objects of the present invention, therefore, is to improve the injection moldability of acrylonitrile, butadiene, styrene graft copolymers.

Another object of the invention is to improve the impact strength of polymerized epsilon caprolactam.

Still another object of the invention is to improve the heat deflection temperature at high loads of polymerized epsilon caprolactam.

Another object of the invention is to improve the tensile strength of the graft copolymer.

These and other objects are obtained by the blending of polymerized epsilon caprolactam with a graft copolymer prepared by polymerizing an alkenyl cyanide and an alkenyl substituted mono nuclear aromatic hydrocarbon in the presence of polybutadiene or a copolymer of butadiene and styrene.

THE CAPROLACTAM POLYMER

The polymerized epsilon caprolactam utilized in the blends of the present invention has the following physical properties.

Tensile strength, p.s.i. at 73° F. _____ 9000
Elongation, 73° F. _____percent__ 250
Izod impact strength, 73° F. _____ 2.3
Izod impact strength, −40° F. _____ 0.7
Heat deflection temperature, ° F., ½″ x ½″ x 5″,
  264 p.s.i. _____ 122
Hardness (R scale) _____ 104

The caprolactam polymer is easily processed by the injection molding technique due to its transition to a liquid at temperatures of 390° to 450° F.

THE GRAFT COPOLYMER

Within recent years it has become increasingly common practice to prepare polymeric products by the so-called "graft" copolymerization technique. As may be determined by reference ot the Report on Nomenclature of the International Union of Pure and Applied Chemistry (published in the Journal of Polymer Science, volume 8, page 260, 1952), the term "graft copolymerization" is employed to designate the process wherein a polymerizable monomer (or mixture of polymerizable monomers) is reacted, under polymerizing conditions, in the presence of a previously formed polymer or copolymer. "A graft copolymer is a high polymer, the molecules of which consist of two or more polymeric parts, of different composition, chemically united together. A graft copolymer may be produced, for example, by polymerization of a given kind of monomer with subsequent polymerization of another kind of monomer onto the product of the first polymerization."

Graft polymers suitable for use in the production of the blends of this invention may be prepared by the interaction, under polymerizing conditions, of a mixture of an alkenyl cyanide and an alkenyl substituted mono nuclear aromatic hydrocarbon exemplified, respectively, by acrylonitrile and styrene, with a polybutadiene latex. The graft copolymer comprises about 40%–90% by weight combined acrylonitrile plus styrene and about 60% to 10% by weight (dry basis) polybutadiene. The acrylonitrile preferably comprises from 5%–30% by weight of the three component graft copolymer (acrylonitrile plus styrene plus polybutadiene), the styrene 30%–80% by weight and the polybutadiene, correspondingly, 10%–60% by weight of the three component graft copolymer.

For the better understanding of this invention, the following example sets forth a description of the preparation of two representative graft copolymers suitable for use in forming the new and improved blends of this invention.

*Example 1*

| | X | Y |
|---|---|---|
| Polybutadiene | 30.0 | 50 |
| Acrylonitrile | 25.0 | 18 |
| Styrene | 45.0 | 32 |
| Cumene hydroperocide | 0.75 | 0.86 |
| Sodium salt of hydrogenated disproportionated resin | 2.0 | 1.96 |
| Sodium pyrophosphate | 0.5 | 0.25 |
| Sodium hydroxide | 0.15 | 0.15 |
| Sodium salt of condensed alkyl naphthalene sulfonic acid | 0.15 | |
| Dextrose | 1.0 | 1.0 |
| Ferrous sulfate | 0.01 | 0.011 |
| Water, including water present in the polybutadiene latex | 160.0 | 196 |

Recipe X was introduced into a glass reactor which was scaled and tumbled for six hours in a water bath heated to 65–85° C. At the end of this time, reaction was essentially complete. The copolymer formed was recovered as follows: The final reaction mixture was coagulated with dilute brine and sulfuric acid, heated to 95° C. to produce partial granulation of the coagulated product to facilitate subsequent filtration and washing operations, filtered, washed and finally dried to constant weight at 110° C.

Recipe Y was charged into a pressure tight reactor. The reactor was placed in a water bath and heated to a temperature of about 50° C. and maintained at this temperature under autogeneous pressure for a period of 85 minutes. At this time, the reaction was essentially complete.

The graft copolymer Y was recovered as follows: The final latex was coagulated with dilute brine and sulfuric acid, heated to 95° C. to produce partial granulation of the coagulated product to facilitate subsequent filtration and washing operations, filtered, washed and finally dried to constant weight at 110° C.

Certain physical properties of the graft copolymers prepared as above described are tabulated below:

| Graft copolymer | X | Y |
|---|---|---|
| Izod Impact Strength, 73° F., ft. lb./inch notch 1/8" | 8.5 | 6.9 |
| Izod Impact Strength, −40° F., ft. lb./inch notch 1/8" | 2.6 | 7.3 |
| Tensile Strength, p.s.i., 73° F. | 5,100 | 2,700 |
| Tensile Elongation, 73° F. percent | 25 | 155 |
| Deflection Temperature, ° F., 1/2" x 1/2" x 5" bar, 264 p.s.i. | 192 | 170 |
| Hardness Rockwell R | 87 | 25 |

Example 2

Graft copolymer X was blended with polymerized epsilon caprolactam at various parts-by-weight ratios. In making the blends, the graft copolymer and the caprolactam polymer were mixed with 1.5 parts by weight Acrawax C, a stearamide, and the mixture was fed into an extruder and extruded at a temperature of 400° F. (the extrusion temperature must be above the melting point of the caprolactam polymer), sheeted, and pelletized. The pellets were injection molded at 450° F. into physical test specimens. The amount of each component polymer and the physical properties of each blend are shown in the following table:

TABLE I

| Sample | A | B | C | D |
|---|---|---|---|---|
| Epsilon caprolactam polymer | 5 | 10 | 30 | 50 |
| Graft copolymer X | 95 | 90 | 70 | 50 |
| Tensile Strength, p.s.i., 73° F. | 4,700 | 4,800 | 5,100 | 6,500 |
| Elongation, 73° F. percent | 35 | 35 | 165 | 205 |
| Izod Impact Strength, 73° F., ft. lb./in. notch 1/8" | 6.3 | 6.8 | 2.3 | 2.0 |
| Izod Impact Strength, −40° F., ft. lb./in. notch 1/8" | 1.7 | 1.5 | 1.4 | 1.2 |
| Heat Deflection Temperature, ° F., 1/2" x 1/2" x 5", 264 p.s.i. | 182 | 180 | 171 | 162 |
| Hardness (R Scale) | 89 | 89 | 95 | 82 |

Example 3

Seventy (70) parts by weight of graft copolymer Y, prepared as set out hereinabove, was blended with 30 parts by weight epsilon caprolactam polymer. In making the blend, the same procedure of Example 2 was followed. The resultant blend had the following physical properties:

TABLE II

| | |
|---|---|
| Tensile strength, p.s.i., 73° F. | 3900 |
| Elongation, 73° F. percent | 185 |
| Izod impact strength, 73° F., ft. lb./in. notch 1/8" | 5.9 |
| Izod impact strength, −40° F., ft. lb./in. notch 1/8" | 1.8 |
| Heat deflection temperature, ° F., 1/2" x 1/2" x 5", 264 p.s.i. | 141 |
| Hardness (R scale) | 56 |

Blends prepared in accordance with this invention may contain additional components, such as pigments, fillers, and the like, which are frequently incorporated into resins and resin blends in accordance with conventional practices well known to those skilled in the art.

While the blends of the present invention may range, in parts by weight, from 5 to 95 parts caprolactam polymer and correspondingly from 95 parts to 5 parts of graft copolymer, the preferred ranges are in the neighborhood of 50 parts by weight of each polymer.

An additional advantage obtained from the present invention is that if the blends contain as much as 30 parts by weight caprolactam polymer, the composition is practically insoluble and unaffected by solvents that normally dissolve the graft copolymer component, e.g. methyl ethyl ketone, methyl isobutyl ketone, and the like. The blends also have much greater stress corrosion than the graft copolymers alone.

In the preparation of the graft copolymer blending component of this invention, the styrene may be replaced, in part or entirely, by alpha methyl styrene, vinyl toluenes and alpha methyl vinyl toluene, including mixtures of two or more such hydrocarbons. Also, the acrylonitrile may be replaced, in part or entirely, with other alkenyl cyanides such as methacrylonitrile and ethacrylonitrile.

The blends of the present invention find their greatest usefulness in the fabrication of shaped articles which are subject to shock and extremes of heat or cold, such as for example, radio and television cabinets, pipe, luggage, industrial and sports helmets and the like articles.

While this invention has been described in connection with certain specific details and examples thereof, these details and examples are illustrative only and are not to be considered limitations on the spirit or scope of the invention except insofar as these may be incorporated in the appended claims.

I claim:

1. A composition comprising a blend of (a) polymerized epsilon caprolactam and (b) a graft copolymer of (1) 60 percent to 10 percent by weight polybutadiene and correspondingly (2) 40 percent to 90 percent by weight of a mixture of an alkenyl cyanide and an alkenyl substituted mono nuclear aromatic hydrocarbon.

2. A composition comprising a blend of (a) polymerized epsilon caprolactam and (b) a graft copolymer of (1) 60 percent to 10 percent by weight polybutadiene and correspondingly (2) 40 percent to 90 percent by weight of a mixture of acrylonitrile and styrene.

3. A composition comprising a blend of (a) from about 95 to 5 parts by weight of polymerized epsilon caprolactam and (b) correspondingly from about 5 to 95 parts by weight of a graft copolymer of (1) 60 percent to 10 percent by weight polybutadiene and correspondingly (2) 40 percent to 90 percent by weight of a mixture of an alkenyl cyanide and an alkenyl substituted mono nuclear aromatic hydrocarbon.

4. A composition comprising a blend of (a) from about 95 to 5 parts by weight of polymerized epsilon caprolactam and (b) correspondingly from about 5 to 95 parts by weight of a graft copolymer of (1) 60 percent to 10 percent by weight polybutadiene and correspondingly (2) 40 percent to 90 percent by weight of a mixture of acrylonitrile and styrene.

5. A composition comprising a blend of (a) about 50 parts by weight of polymerized epsilon caprolactam and (b) correspondingly about 50 parts by weight of a graft copolymer of (1) 60 percent to 10 percent by weight polybutadiene and correspondingly (2) 40 percent to 90 percent by weight of a mixture of acrylonitrile and styrene.

References Cited in the file of this patent

UNITED STATES PATENTS

| 2,249,686 | Dykstra | July 15, 1941 |
| 2,802,808 | Hayes | Aug. 13, 1957 |

FOREIGN PATENTS

| 533,879 | Canada | Nov. 27, 1956 |

UNITED STATES PATENT OFFICE
CERTIFICATE OF CORRECTION

Patent No. 3,134,746

May 26, 1964

Thomas S. Grabowski

It is hereby certified that error appears in the above numbered patent requiring correction and that the said Letters Patent should read as corrected below.

Column 2, Example 1, first column, fourth line thereof, for "hydroperocide" read -- hydroperoxide --; column 4, line 5, after "corrosion" insert -- resistance --.

Signed and sealed this 10th day of November 1964.

(SEAL)
Attest:

ERNEST W. SWIDER
Attesting Officer

EDWARD J. BRENNER
Commissioner of Patents